(12) United States Patent
Fournier

(10) Patent No.: US 12,471,564 B2
(45) Date of Patent: Nov. 18, 2025

(54) FEED BARRIER

(71) Applicant: Nicolas Fournier, Esnoms Au Val (FR)

(72) Inventor: Nicolas Fournier, Esnoms Au Val (FR)

( * ) Notice: Subject to any disclaimer, the term of this patent is extended or adjusted under 35 U.S.C. 154(b) by 0 days.

(21) Appl. No.: 18/256,485

(22) PCT Filed: Dec. 7, 2021

(86) PCT No.: PCT/EP2021/084661
§ 371 (c)(1),
(2) Date: Jun. 8, 2023

(87) PCT Pub. No.: WO2022/122767
PCT Pub. Date: Jun. 16, 2022

(65) Prior Publication Data
US 2024/0023515 A1    Jan. 25, 2024

(30) Foreign Application Priority Data

Dec. 9, 2020 (FR) .................................. 2012900
Sep. 28, 2021 (FR) .................................. 2110211

(51) Int. Cl.
*A01K 1/06*    (2006.01)
*A01K 15/04*    (2006.01)
*A01K 1/10*    (2006.01)

(52) U.S. Cl.
CPC ............ *A01K 1/0606* (2013.01); *A01K 15/04* (2013.01); *A01K 1/105* (2013.01)

(58) Field of Classification Search
CPC ...... A01K 1/105; A01K 15/04; A01K 1/0606; A01K 1/06
USPC .................................................. 119/739–750
See application file for complete search history.

(56) References Cited

U.S. PATENT DOCUMENTS

| 102,804 | A | * | 5/1870 | Gifford | .................. | A01K 1/062 |
| | | | | | | 119/746 |
| 333,275 | A | * | 12/1885 | Barnes | ................. | A01K 1/0606 |
| | | | | | | 119/739 |
| 356,281 | A | * | 1/1887 | Haley | .................... | A01K 1/062 |
| | | | | | | 119/745 |

(Continued)

FOREIGN PATENT DOCUMENTS

DE    3237211 A1 *  9/1983
DE    4217415 A1   12/1993

(Continued)

OTHER PUBLICATIONS

International Search Report and Written Opinion issued on Mar. 9, 2022, in corresponding International Application No. PCT/EP2021/084661, 12 pages.

(Continued)

*Primary Examiner* — Peter M Poon
*Assistant Examiner* — Angelica Alejandra Almeida Bonnin
(74) *Attorney, Agent, or Firm* — Maier & Maier, PLLC

(57) ABSTRACT

A feed barrier includes a plurality of vertical flat gantries arranged in a row next to each other along a trough of a stable, each gantry determining, with the ground and said adjacent gantry or end post, an internal L-shaped space. A trap door associated with each portal and movable with respect to the latter in order to close or not close at least the lower side portion of said space, and an exclusively mechanical lock for switching the feed barrier from an access position to a locked position, and vice versa.

12 Claims, 5 Drawing Sheets

(56) References Cited

U.S. PATENT DOCUMENTS

| | | | | |
|---|---|---|---|---|
| 363,902 A * | 5/1887 | McCartney | A01K 1/062 | 119/749 |
| 384,106 A * | 6/1888 | Whalen | A01K 1/06 | 119/778 |
| 644,923 A * | 3/1900 | Joost | A01K 1/0606 | 119/741 |
| 699,988 A * | 5/1902 | Terrell | A01K 1/06 | 119/752 |
| 772,520 A * | 10/1904 | Kirk | A01K 1/062 | 119/742 |
| 852,439 A * | 5/1907 | Lattin | A01K 1/0606 | 119/739 |
| 889,045 A * | 5/1908 | Rodden | A01K 1/0606 | 119/521 |
| 1,020,710 A * | 3/1912 | Rau | A01K 1/0606 | 119/750 |
| 1,099,623 A * | 6/1914 | Sletten | A01K 1/062 | 119/904 |
| 1,181,986 A * | 5/1916 | Baetz | A01K 1/062 | 119/904 |
| 1,350,480 A * | 8/1920 | Walter | A01K 1/062 | 119/741 |
| 1,367,614 A * | 2/1921 | Maciejewski | A01K 5/01 | 119/742 |
| 1,401,428 A * | 12/1921 | Mitchell | A01K 1/062 | 119/904 |
| 1,529,213 A * | 3/1925 | Rassmann | A01K 1/062 | 119/741 |
| 1,561,123 A * | 11/1925 | Stauffer | A01K 1/062 | 119/747 |
| 1,631,337 A * | 6/1927 | Quade | A01K 1/062 | 119/741 |
| 1,739,227 A * | 12/1929 | Grubb | A01K 1/062 | 119/738 |
| 2,058,142 A * | 10/1936 | Ferris | A01K 1/062 | 292/31 |
| 2,107,477 A * | 2/1938 | Grubb | A01K 1/062 | 119/742 |
| 2,625,907 A * | 1/1953 | Montero | A01K 1/0606 | 119/742 |
| 2,754,803 A * | 7/1956 | Stammel | A01K 1/0606 | 119/741 |
| 3,046,941 A * | 7/1962 | De Filippi | A01K 1/0606 | 119/740 |
| 3,135,240 A * | 6/1964 | Hickman | A01K 1/0613 | 119/735 |
| 3,734,059 A * | 5/1973 | Rodrigues | A01K 1/12 | 119/739 |
| 4,037,566 A * | 7/1977 | Albers | A01K 1/0606 | 119/904 |
| 4,366,776 A * | 1/1983 | Early | A01K 1/06 | 119/731 |
| 5,226,387 A * | 7/1993 | Anderson | A01K 1/0606 | 119/742 |
| 5,329,883 A * | 7/1994 | White | A01K 27/005 | 119/779 |
| 5,645,015 A * | 7/1997 | DaSilveira | A01K 1/0606 | 119/741 |
| 5,975,027 A * | 11/1999 | DaSilveira | A01K 1/0606 | 119/741 |
| 6,082,306 A * | 7/2000 | Hatfield | A01K 1/0606 | 119/524 |
| 7,784,431 B2 * | 8/2010 | Hatfield | A01K 1/0606 | 119/739 |
| 9,167,800 B2 * | 10/2015 | Spicola, Jr. | A01K 29/005 | |

FOREIGN PATENT DOCUMENTS

| | | | | |
|---|---|---|---|---|
| EP | 0815724 A1 * | 1/1998 | | A01K 1/0606 |
| FR | 1343846 A * | 11/1963 | | |
| FR | 2752669 A1 * | 3/1998 | | A01K 1/0606 |
| FR | 2776891 A1 | 10/1999 | | |
| GB | 635640 A * | 4/1950 | | |
| GB | 1540392 A * | 2/1979 | | A01K 1/0606 |
| NL | 9000107 A * | 8/1991 | | A01K 1/0606 |
| NL | 1001138 C2 * | 3/1997 | | A01K 1/0606 |

OTHER PUBLICATIONS

International Preliminary Report on Patentability issued on Jan. 13, 2023, in corresponding International Application No. PCT/EP2021/084661, 14 pages.

* cited by examiner

[Fig. 1]
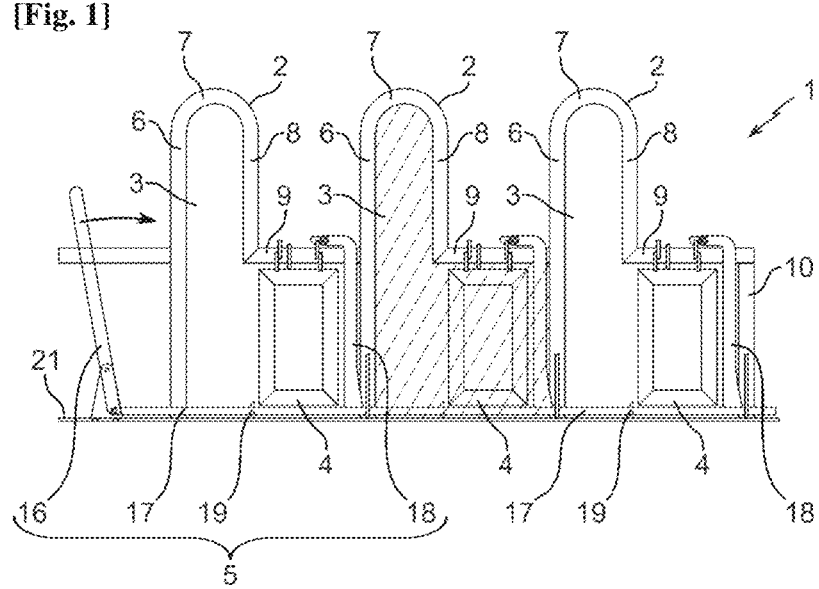
[Fig. 2]
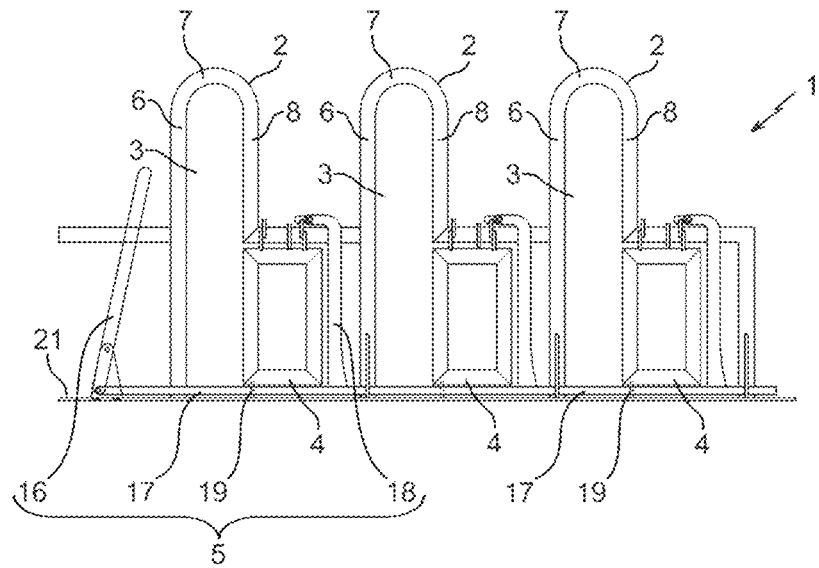

[Fig.3]
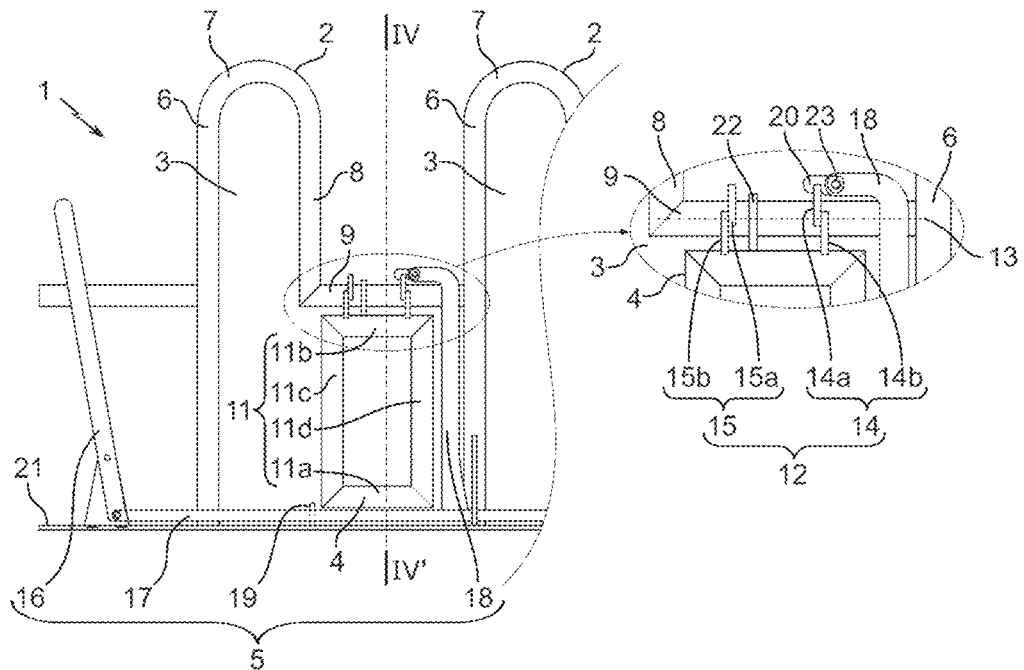
[Fig. 4]
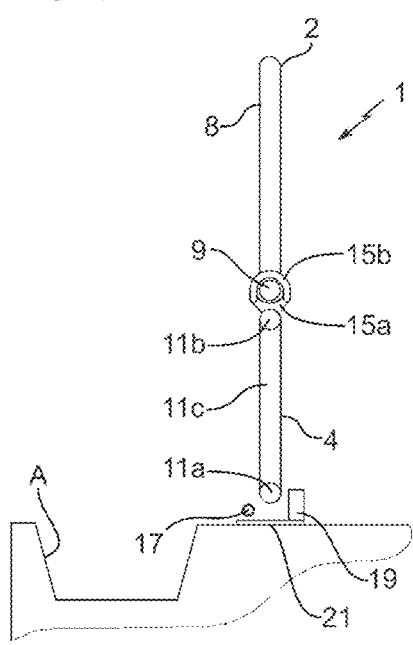

[Fig. 5]
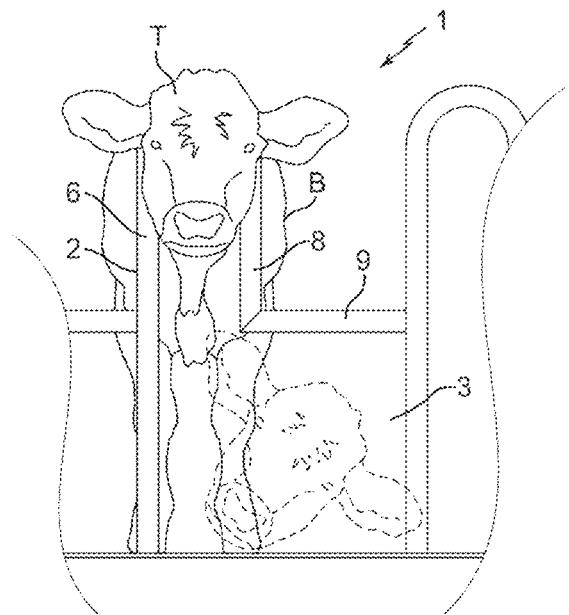
[Fig. 6]
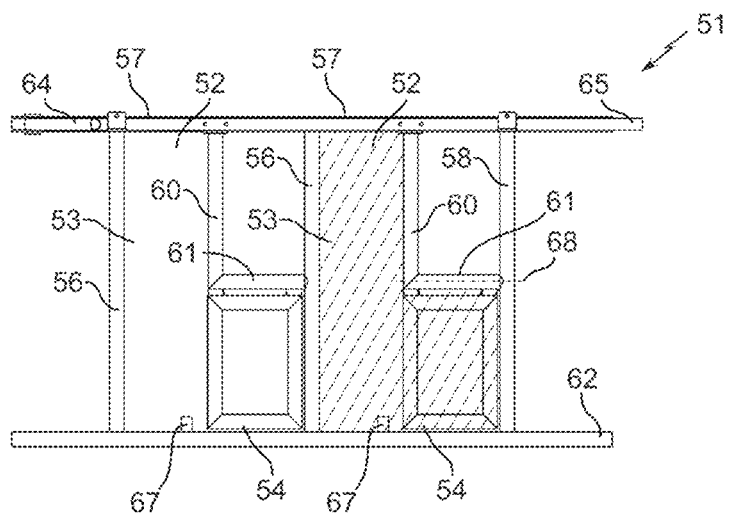

[Fig. 7]
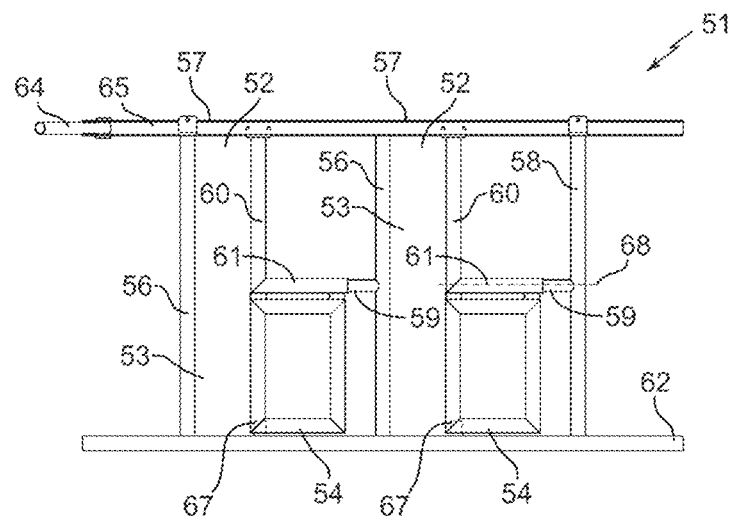
[Fig. 8]
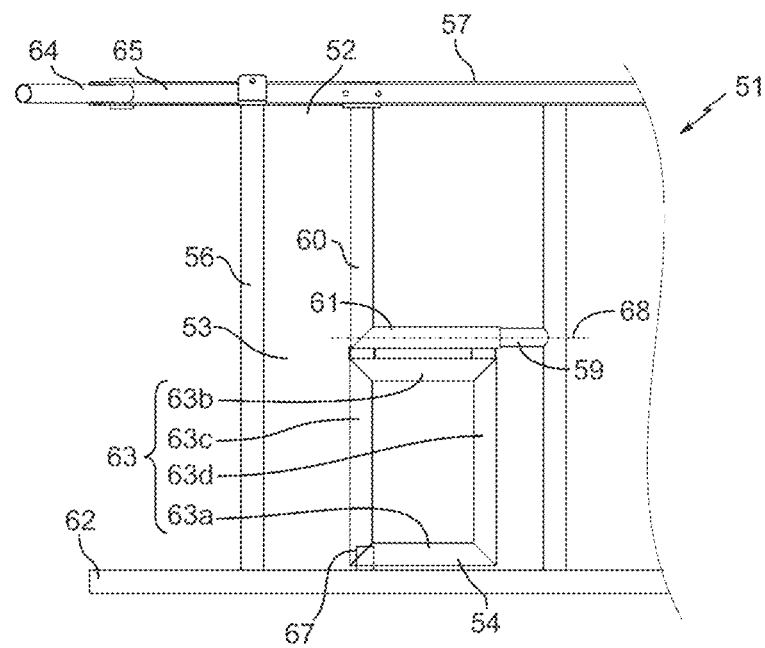

[Fig. 9]
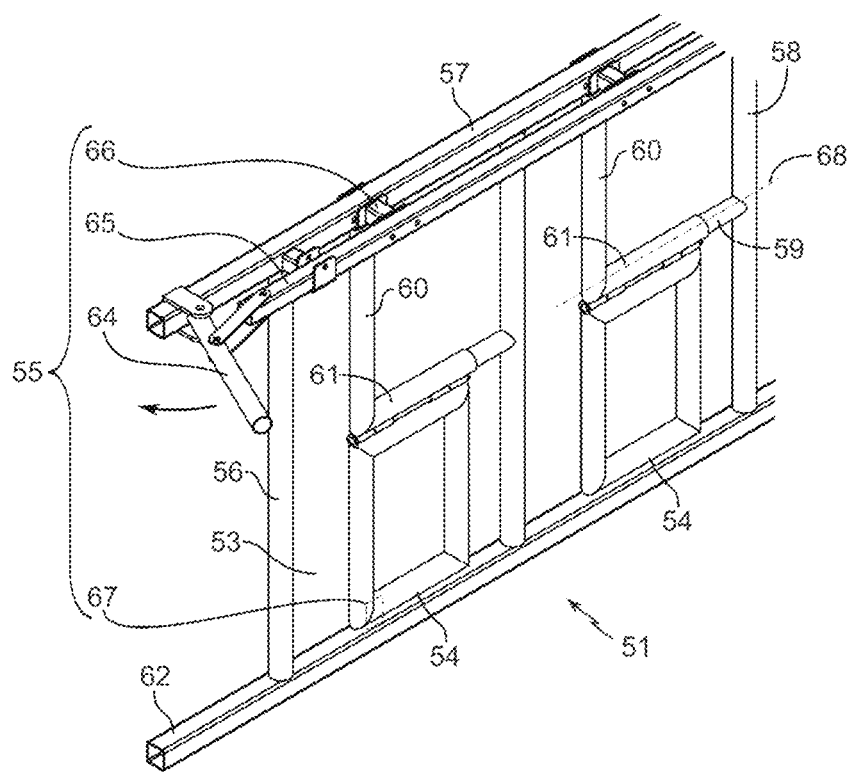

FEED BARRIER

FIELD

The present invention relates to the general field of agriculture and in particular to cattle, sheep or goat farming. More specifically it relates to a device for limiting the movements of an animal while eating.

BACKGROUND

Particularly in cattle farming, it is known to use devices, referred to as feed barriers, which are installed in front of a trough and are intended to limit the movements of an animal while eating. Conventionally, in known feed barriers, the animal is immobilised by lowering its head into a frame which is formed, on the one hand, by a column of the stall frame and, on the other hand, by a balancing element guided freely on the upper beam of said frame and mounted so as to be able to pivot in the plane of the corresponding opening of the frame by way of a control linkage, such that its upper part moves away from said frame column while its lower part moves towards it.

These known feed barriers are described in particular in German patent applications DE 42 17 415 and DE 32 37 211, British patent application GB 635 640 and French patent application FR 2 776 891.

While these known feed barriers are effective, they do have a certain number of disadvantages. Firstly, they do not respect the animal's natural movements, as the latter needs to lift its head to engage in the space defined by the column of the stall frame, the balancing element and the upper beam. Lastly, these feed barriers can be dangerous for the animal, as the latter can get its neck wedged between the column of the stall frame and the balancing element forming a V shape and can end up injuring or strangling itself.

SUMMARY

The aim of the present invention is therefore to propose an alternative to known feed barriers which is durable, stable and easy to use, and at the same time is risk-free for the animal and respects its natural movements.

According to the invention, a feed barrier is therefore proposed which is remarkable in that it includes:
- a plurality of vertical planar portal frames configured to be arranged side-by-side in a row along the trough of a barn, each frame determining an L-shaped internal space with the ground and said adjacent frame or end post,
- a flap associated with each frame and movable relative to the latter for closing off or not closing off at least the lower lateral part of said space, and
- exclusively mechanical blocking means for changing the feed barrier from its "access" position, in which each flap can pivot at least towards the front and the rear of the associated frame about a generally horizontal axis, to its "blocking" position, in which said pivoting is blocked at least towards the rear of said frame, and vice versa.

According to a first embodiment, each frame comprises a first vertical upright arranged to be fixed to the ground, an upper crosspiece extending generally perpendicularly from said first upright from the upper end of the latter, a second vertical upright extending towards the ground from the free end of said upper crosspiece and a middle crosspiece extending generally parallel to said upper crosspiece from the lower end of said second upright in a direction opposite said first upright, the end of said middle crosspiece opposite said second upright being fixed to the first upright of an adjacent portal or to the upper end of an end post.

In an advantageous manner, each flap comprises a planar structure arranged below the middle crosspiece of the associated frame and is configured so that its height and width are strictly smaller than the distance between the underside of said middle crosspiece and the ground and the length of said middle crosspiece, and in that each flap is associated with connecting means making it possible to attach the structure to the middle crosspiece of the associated frame, for pivoting said structure about the longitudinal axis of said middle crosspiece and for sliding said structure along said longitudinal axis.

The connecting means preferably include at least a first ring fixed to the top of the structure and arranged around the middle crosspiece of the associated frame, the internal diameter of said first ring being strictly greater than the external diameter of said middle crosspiece.

The connecting means include advantageously a second ring identical to said first ring and being arranged on the side of the second upright of the associated frame and in that the first and second rings are each advantageously formed by two half rings assembled together.

In an advantageous manner, the blocking means include at least:
- a control lever pivoting about a horizontal axis perpendicular to the row of frames,
- a generally horizontal bar arranged along the frames, one end of which is connected to the lower end of said control lever and can be moved in translation along its longitudinal axis,
- a plurality of generally vertical arms fixed at their lower end along the bar, each arm being connected removably to the flap of one of the frames, and
- a stop configured to be fixed to the ground on the rear side of each frame substantially at the foot of the second upright thereof.

The upper end of each arm is preferably provided with a hook capable of pivoting to cooperate with the top of the first ring, the hook being associated with a torsion spring for maintaining the cooperation between said hook and the top of said first ring.

According to an advantageous embodiment, the feed barrier includes a plate arranged to be fixed to the ground of the barn along the trough and to which the frames, the end post and the blocking means are fixed.

According to one embodiment, each frame includes at least:
- a first vertical upright configured to be fixed to the ground at its lower end,
- an upper crosspiece extending generally perpendicularly to said first upright from the upper end of the latter, the end of said upper crosspiece opposite said first upright being fixed to the first upright of an adjacent frame or to the upper end of an end post,
- a first middle crosspiece extending in the same direction and generally parallel to said upper crosspiece from said first upright,
- a second vertical upright extending to the ground, advantageously over a height substantially equal to half the height of said first upright, and slidably mounted on said upper crosspiece, and
- a second middle crosspiece extending generally parallel to said upper crosspiece from the lower end of said second upright in the direction of said first upright, said second middle crosspiece being mounted in a sliding manner on the first middle crosspiece, the latter being shaped to be inserted coaxially into said second middle crosspiece.

In an advantageous manner, each flap comprises a planar structure arranged below the second middle crosspiece of the associated frame and being configured so that its height and width respectively are strictly less than the distance between the underside of said second middle crosspiece and the ground, and the length of said second middle crosspiece, and each flap is pivotably mounted on the lower edge of said second middle crosspiece.

In an advantageous manner, the blocking means include at least:
- a control lever pivoting about a vertical axis parallel to the row of frames,
- a generally horizontal bar arranged along the frames at the level of the upper crosspiece, connected at one of its ends to one of the ends of said control lever and movable in translation along its longitudinal axis,
- a plurality of arms fixed at one of their ends along the bar, each arm being removably connected at its other end to the second upright of one of the frames, and
- a stop configured to be fixed to the ground, or if necessary to the lower bar, on the rear side of each frame.

According to an advantageous embodiment, the feed barrier includes a plate configured to be fixed to the ground of the barn along the trough and to which the frames and the end post are fixed.

BRIEF DESCRIPTION OF THE FIGURES

Further advantages and features will become apparent form the following description of an embodiment of the invention with reference to the appended figures, in which:

FIG. 1 is a view of the front face of a feed barrier according to the invention equipped with a plurality of frames in the "access" position.

FIG. 2 is a view of the front face of the plurality of frames of [FIG. 1] in the "blocking" position.

FIG. 3 is an enlarged partial view of a frame of [FIG. 1] with an enlarged view of a detail.

FIG. 4 is a partial vertical cross-section along axis IV-IV' of [FIG. 3].

FIG. 5 is a partial view of a feed barrier of [FIG. 3] with a bovine animal engaged in a frame shown without the flap.

FIG. 6 is a view of the front face of an embodiment variant of the feed barrier according to the invention provided with plurality of frames in the "access" position.

FIG. 7 is a view of the front face of the plurality of frames of [FIG. 6] in the "blocking" position.

FIG. 8 is an enlarged partial view of a frame of [FIG. 6] with an enlarged view of a detail.

FIG. 9 is an enlarged perspective view of part of the blocking means of the plurality of frames of [FIG. 6].

DETAILED DESCRIPTION

FIGS. 1 to 4 show a feed barrier 1 according to the invention installed in a barn, not shown, for feeding livestock such as cattle for example.

Said feed barrier 1 includes a plurality of vertical planar frames 2 arranged side-by-side in a row and each configured to be fixed to the ground of the barn along a trough A (cf. [FIG. 4]), and to define with the ground and an adjacent frame 2 an L-shaped internal space 3, a flap 4 associated with each of said frames 2 and being movable relative to the latter to close off or not close off at least part of said space 3, and blocking means 5 for changing the feed barrier 1 from its "access" position to its "blocked" position and vice versa.

The terms "planar frame" or "planar structure" denote a frame or a structure, in which the longitudinal axes of the component parts are all coplanar. In this present case, the longitudinal axes of the component parts of each frame 2 are all in the same vertical plane.

Furthermore, the term "fixed to the ground" means that an element or part of an element of the feed barrier 1 according to the invention is fixed either directly to the ground, or indirectly to a framework itself fixed to the ground, such as for example a low wall or even a bar.

Each frame 2 comprises a first vertical upright 6 arranged to be fixed to the ground (at its lower end), an upper crosspiece 7 extending generally perpendicular to said first upright 6 from the upper end of the latter, a second vertical upright 8 extending towards the ground from the free end of said upper crosspiece 7, advantageously at a height substantially equal to half the height of said first upright 6, and a middle crosspiece 9 extending generally parallel to said upper crosspiece 7 from the lower end of said second upright 8 in a direction opposite said first upright 6, the end of said middle crosspiece 9 opposite said second upright 8 being fixed to the first upright 6 of an adjacent frame 2 or to the upper end of an end post 10.

The term "end post" here denotes a post, advantageously vertical, arranged to be fixed to the ground (at its lower end) and arranged at the end of the row of frames 2 of the feed barrier 1 (cf. [FIG. 1] or [FIG. 2]).

Likewise, the terms "generally perpendicular" or "generally parallel" are used here to denote two elements or parts of elements of the feed barrier 1 according to the invention forming between them an angle of between 70 and 110 degrees and between 0 and 20 degrees respectively.

The component parts of each frame 2, namely the first upright 6, the upper crosspiece 7, the second upright 8 and the middle crosspiece 9, are advantageously metal tubes assembled by welding. Similarly, for reasons described below, the upper crosspiece 7 is advantageously curved upwards.

It goes without saying that the component parts of each frame 2 can be of any other type such as for example solid bars or I or H-shaped profiles, without departing from the scope of the present invention.

It is clearly understood that with the specific configuration of these different component parts described above, each frame 2 defines, between said component parts, the adjacent frame 2 and the ground, an L-shaped internal space 3, represented by a hatched area in [FIG. 1].

The feed barrier 1 according to the invention also includes a movable flap 4 associated with each of said frames 2. Said flap 4 comprises a planar structure 11 with a general quadrilateral shape, advantageously in the form of a rectangle, arranged to the right of the lateral lower part of the internal space 3, namely below the middle crosspiece 9 of the associated frame 2, said structure 11 being configured such that its height and width are strictly smaller than the distance between the underside of said middle crosspiece 9 and the ground and the length of said middle crosspiece 9.

As with each frame 2 and with reference to [FIG. 3], the component parts of said structure 11, namely a horizontal lower crosspiece 11a, a horizontal upper crosspiece 11b and a first vertical upright 11c located on the side of the first upright 6 of the associated frame 2 and a second vertical upright 11*d* located on the opposite side, are advantageously metal tubes assembled by welding, but they can also be of a completely different type.

In addition, with reference to [FIG. 3], the flap 4 is associated with connecting means 12 enabling the structure 11 to be connected to the middle crosspiece 9 of the associated frame 2, for pivoting this structure 11 about the longitudinal axis 13 of said middle crosspiece 9 and sliding said structure 11 along said longitudinal 13 axis. Given the specific configuration of the various component parts of each frame 2, it is understood that the longitudinal axis 13 of the middle crosspiece 9 is generally horizontal. To achieve this, the connecting means 12 include a first ring 14 and a second ring 15 fixed, spaced apart, to the top of the structure 11, i.e. to its upper crosspiece 11*b*, and arranged around the middle crosspiece 9 of the associated frame 2, said second ring 15 being arranged on the side of the second upright 8 of the associated frame 2. To enable the structure 11 to slide along the longitudinal axis 13 of the middle crosspiece 9, it is understood that the internal diameter of each of the first and second rings 14, 15 has to be strictly greater than the external diameter of said middle crosspiece 9.

To facilitate the installation and maintenance, the first and second rings 14, 15 are each advantageously formed by two half-rings 14*a*, 14*b*; 15*a*, 15*b* assembled together by any suitable means, such as for example screws or bolts.

The first and second rings 14, 15 can also be made from a chain or cable, without departing from the scope of the present invention.

It is understood that, without departing from the scope of the present invention, the connecting means 12 may include only a first ring 14, the latter being then thicker to ensure the easy sliding of the structure 11 of the flap 4 along the longitudinal axis 13 of the middle crosspiece 9 of the associated frame 2.

The feed barrier 1 according to the invention also includes blocking means 5 for changing the feed barrier 1 from its "access" position, in which the structure 11 of each flap 4 can pivot towards the front or the rear of the feed barrier 1 about the longitudinal axis 13 of said middle crosspiece 9 of the associated frame 2, to its "blocked" position in which said pivoting of said structure 11 is blocked at least towards the rear of said feed barrier 1, and vice versa. The blocking means 5 is exclusively mechanical.

The term "exclusively mechanical" here means that the blocking means 5 does not require electric, hydraulic or even pneumatic energy to block or release the pivoting of the structure 11 of each flap 4.

Likewise, here the term "front" denotes any element or part of an element of the feed barrier on the side of the trough A and "rear" denotes any element or part of an element of the feed barrier on the opposite side.

To achieve this, the blocking means 5 includes at least:
- a control lever 16 pivoting about a horizontal axis perpendicular to the row of frames 2 of the feed barrier 1 according to the invention,
- a generally horizontal bar 17 arranged along the frames 2, connected at one end to the lower end of said control lever 16 and movable in translation along its longitudinal axis,
- a plurality of generally vertical arms 18 fixed at their lower ends along the bar 17, each arm 18 being connected in a removable manner at its upper end to connecting means 12 of the flap 4 of one of the frames 2, and
- a stop 19 configured to be fixed to the ground on the rear side of each frame 2 substantially at the foot of the second upright 8 of the latter.

The terms "generally horizontal" or "generally vertical" are used here to denote an element or part of an element of the feed barrier according to the invention forming an angle of between 0 and 20 degrees with the horizontal and the vertical respectively.

It is clearly understood that the blocking means 5 could include, instead of the control lever 16 and/or bar 17 for example a rack-and-pinion assembly connected to a wheel or a motor or even a cylinder-type actuator. However, all of these solutions would be more complex to manufacture and maintain and most would require a power source.

In addition, without departing from the scope of the present invention, the blocking means 5 could be such that the stops 19 are fixed to the bar 17 and each flap 4 is only able to pivot about the longitudinal axis 13 of the middle crosspiece 9 of the associated frame 2.

To achieve this, the upper end of each arm 18 is provided with a hook 20 capable of pivoting to cooperate with the top of the first ring 14, the hook 20 being associated with a torsion spring 23 for maintaining the cooperation between said hook 20 and the top of said first ring 14.

It goes without saying that the blocking means 5 can include two stops 19 arranged on either side of each frame 2, without departing from the scope of the present invention.

In addition, each arm 18 has the general shape of an inverted L, so as to bypass the structure 11 of the associated flap 4 and not prevent it from pivoting about the longitudinal axis 13 of said middle crosspiece 9 of the associated frame 2.

Thus, with this configuration of the blocking means 5, the following procedure can be used to change the feed barrier 1 according to the invention from its "access" position shown in FIG. 1 to its "blocked" position shown in [FIG. 2], in which the structure 11 of each flap 4 can no longer pivot about the longitudinal axis 13 of said middle crosspiece 9 of the associated frame 2 at least towards the rear of the feed barrier 1, it is necessary to slide said structure 11 in the direction of the second upright 8 of the associated frame 2.

To achieve this, it is necessary to move the upper end of the control lever 16 of the blocking means 5 towards the frames 2 (see arrow in [FIG. 1]). This action causes the translation of the bar 17/arm 18 assembly in opposite direction but also causes sliding in this same opposite direction of the structure 11 of each of the flaps 4 due to the cooperation of the hook 20 of the arms 18 and the first ring 14 of the connecting means 12 of the flaps 4. The structure 11 of each flap 4 thus slides along the longitudinal axis 13 of the middle crosspiece 9 of the associated frame 2 until the first upright 11*c* is substantially in line with the second upright 8 of said frame 2, its lower crosspiece 11*a* then being beyond the associated stop 19, which has the result of preventing any pivoting of said structure 11 about the longitudinal axis 13 of said middle crosspiece 9 of said frame 2 at least towards the rear of the feed barrier 1.

To release the pivoting and return the feed barrier 1 to an "access" position, the procedure is reversed by moving the upper end of the control lever 16 of the blocking means 5 in opposite direction relative to the frames 2.

In addition, to facilitate the preassembly and workshop adjustments of the feed barrier 1 according to the invention, the latter includes a plate 21 configured to be fixed to the ground of the barn along the trough A and to which the frames 2, the end post 10 and the blocking means 5 are attached. With this advantageous configuration, during the installation of the feed barrier 1 according to the invention in a barn, it is only necessary to install fasteners, such as for example screw and pin assemblies to secure the plate 21 to the ground.

In addition, with reference to [FIG. 3], the connecting means 12 of each flap 4 can include a stop 22 fixed to the middle crosspiece 9 of the associated frame 2 between the first ring 14 and the second upright 8 of said frame 2 and intended to limit the sliding of the structure 11 of said flap 4 along the longitudinal axis 13 of said middle crosspiece 9.

It is understood that the person skilled in the art will have no difficulty determining the dimensions of each frame 2 and its associated flap 4 according to the type, breed and dimensions of the animal using the feed barrier 1 according to the invention.

With reference to [FIG. 5], to access the trough A, a bovine animal B presents itself in front of the rear of a frame 2 of the feed barrier 1 in the "access" position and naturally inclines its neck so as to bring its head T to the side and to ground level (position shown by a dashed line in [FIG. 5]). Then, the bovine animal B moves forward and its head T pushes the flap 4 (not shown to facilitate understanding) towards the front of said frame 2 so as to pass through the lower lateral part of the internal space 3, i.e. under the middle crosspiece 9 of said frame 2. Lastly, the bovine animal B continues to advance until its shoulders bear against the rear of the first and second uprights 6, 8 of said frame 2 and raises its neck between said first and second uprights 6, 8. Once the bovine animal B is in this position, the control lever 16 is moved to change the feed barrier 1 into its "blocked" position in order to prevent the pivoting of the structure 11 of the associated flap 4 to the rear of the feed barrier 1 and consequently the backwards movement of said bovine animal B. Once the bovine animal B has been fed, the control lever 16 is moved in opposite direction to move the feed barrier 1 into its "access" position and allow the bovine animal B to disengage from the feed barrier 1 according to the invention.

It is clear that the feed barrier 1 according to the invention is particularly sturdy and easy to use without posing any risk to the animal and respects the natural movements of said animal. Indeed, once the feed barrier 1 is in the "blocked" position, bovine animal B is free to naturally raise or lower its neck in line with its body without any risk of getting trapped between the elements of the frame 2. In addition, as described above, the upper crosspiece 7 of each frame 2 is advantageously curved at the top to match the shape of the top of the neck of the bovine animal B and avoid any risk of injury.

It is clear that the feed barrier 1 according to the invention is particularly well adapted to the natural functioning of a farm animal such as for example a bovine animal, since the optimal vision of such an animal extends within a square metre of the ground in front of it.

Advantageously, according to another not shown embodiment, the feed barrier 1 according to the invention is fixed to a low wall with a height of in the order of 50 cm, so as to leave sufficient space up to the animal's shoulder, i.e. about 1 m from the ground.

Such a space is then large enough for the animal to easily put its head through, without the risk that the animal will move too far forward and get stuck in said feed barrier 1. These dimensions, which correspond to adult bovine animals, are given by way of example and can easily be adapted by the person skilled in the art according to the type, breed and dimensions of the animal using the feed barrier 1 according to the invention.

According to a final embodiment shown in FIGS. 6 to 9, the protective device 51 is similar to the protective device 1 described above and includes a plurality of vertical planar frames 52 arranged side-by-side in a row and each being configured to be fixed to the ground of the barn along a trough, and to define with the ground and an adjacent frame 52 an L-shaped internal space 53 (see hatched area of [FIG. 6]), a flap 54 associated with each of said frames 52 and being movable relative to the latter for closing off or not closing off at least part of said space 53, and blocking means 55 for moving the feed barrier 1 from its "access" position to its "blocked" position and vice versa.

The terms "planar frame" or "planar structure" denote a frame or a structure in which the longitudinal axes of the component parts are all coplanar. In the present case, the longitudinal axes of the component parts of each frame 52 are all in the same vertical plane.

In addition, the term "fixed to the ground" means that an element or a part of an element of the feed barrier 51 according to the invention is fixed either directly to the ground or indirectly to a framework which is itself fixed to the ground, and such as for example a low wall or even a bar.

Each frame 52 comprises at least:
- a first vertical upright 56 configured to be fixed to the ground at its lower end,
- an upper crosspiece 57 extending generally perpendicularly from said first upright 56 from the upper end thereof, the end of said upper crosspiece 57 opposite the first upright 56 being fixed to the first upright 56 of an adjacent frame 52 or to the upper end of an end post 58,
- a first middle crosspiece 59 extending in the same direction and generally parallel to said upper crosspiece 57 from said first upright 56,
- a second vertical upright 60 extending to the ground, advantageously over a height substantially equal to half the height of said first upright 56, and mounted so as to slide on said upper crosspiece 57, and
- a second middle crosspiece 61 extending generally parallel to said upper crosspiece 57 from the lower end of said second upright 60 towards said first upright 56, said second middle crosspiece 61 being mounted to slide on the first middle crosspiece 59, the latter being shaped to fit coaxially into said second middle crosspiece 61.

The term "end post" here denotes a post, advantageously vertical, arranged to be fixed to the ground (at its lower end) and arranged at the end of the row of frames 52 of the feed barrier 51 (cf. [FIG. 6]).

In addition, to facilitate the preassembly and workshop adjustments of the feed barrier 51 according to the invention, the latter includes a lower bar 62 configured to be fixed to the ground of the barn along the trough and to which the frames 52 and the end post 58 are fixed.

Likewise, a single bar is used to form the upper crosspiece 57 of each frame 52 of the feed barrier.

The component parts of each frame 52, namely the first upright 56, the upper crosspiece 57, the first middle crosspiece 59, the second upright 60 and the second middle crosspiece 61 are advantageously metal tubes, and the "first upright 56—upper crosspiece 57—first middle crosspiece 59" and "second upright 60—second middle crosspiece 61" assemblies are assembled by welding.

It goes without saying that the component parts of each frame 52 can be of any other type such as for example solid bars or I or H-shaped profiles, without departing from the scope of the present invention.

It is understood that with the specific configuration of these different component parts described above, each frame 52 defines an L-shaped internal space 53 between said component parts, the adjacent frame 52 adjacent and the ground, represented by a hatched area in [FIG. 6].

The feed barrier 51 according to the invention also includes a movable flap 54 associated with each of said frames 52. Said flap 54 comprises a planar structure 63 with a generally quadrilateral form, advantageously in the form of a rectangle, similar to the structure 11 of the flap 4 described above, and arranged to the right of the lower lateral part of the internal space 53, i.e. below the second middle crosspiece 61 of the associated frame 52, said structure 63 being configured so that its height and width are strictly smaller than the distance between the underside of said second middle crosspiece 61 and the ground and the length of said second middle crosspiece 61.

As with each frame 52 and with reference to [FIG. 8], the component parts of said structure 63, namely a lower horizontal crosspiece 63a, an upper horizontal crosspiece 63b and a first vertical upright 63c arranged on the side of the first upright 56 of the associated frame 52 and a second vertical upright 63d located on the opposite side, are advantageously metal tubes assembled by welding, but they could also be of a completely different type.

Furthermore, the flap 54 is mounted pivotably on the lower edge of the second middle crosspiece 61 of the associated frame 52. Given the specific configuration of the different component parts of each frame 2, it is clear that the flap 54 therefore pivots about a generally horizontal axis.

The feed barrier 51 also includes blocking means 55 for moving the feed barrier 51 from its "access" position, in which the structure 63 of each flap 4 can pivot from the front to the rear of the feed barrier 1, to its "blocking" position, in which said pivoting of said structure 62 is blocked at least towards the rear of said feed barrier 51, and vice versa. The blocking means 55 are, like the blocking means 5 described above, exclusively mechanical.

To achieve this, the blocking means 55 include at least:
- a control lever 64 pivoting about a vertical axis parallel to the row of frames 52 of the feed barrier 51 according to the invention,
- a generally horizontal bar 65 arranged along the frames 52 at the level of the upper crosspiece 57, connected at one of its ends to one of the ends of said control lever 64 and movable in translation along its longitudinal axis,
- a plurality of arms 66 fixed at one of their ends along the bar 65, each arm 66 being removably connected at its other end to the second upright 60 of one of the frames 52, and
- a stop 67 arranged to be fixed relative to the ground, or if necessary to the lower bar 62, on the rear side of each frame 52.

It is clear that the blocking means 55 could include, for example, instead of the control lever 64 and/or the bar 65, a rack-and-pinion assembly associated with a wheel or motor or even a cylinder-type actuator. However, all of these solutions would be more complex to manufacture and maintain, and most would require a power source.

It goes without saying that the blocking means 55 may include two stops 67 arranged on either side of each frame 52, without departing from the scope of the present invention.

Thus, with this configuration of the blocking means 55, in the following manner the feed barrier 51 according to the invention is moved from its "access" position shown in [FIG. 6] to its "blocking" position shown in [FIG. 7], in which the structure 63 of each flap 54 can no longer pivot at least towards the rear of the feed barrier 51, the "second upright 60—second middle crosspiece 61—flap 54" assembly has to be slid towards the first upright 56 of an adjacent frame 52 or on the upper end of an end post 58.

To achieve this, it is necessary to move the upper end of the control lever 64 of the blocking means 55 in opposite direction to the frames 52 (cf. arrow in [FIG. 9]). This action causes the translation of the bar 65/arms 66 assembly in the same direction, but also causes the sliding, in the same direction, of the "second upright 60—second middle crosspiece 61—flap 54" assemblies. Each flap 54 thus slides along the longitudinal axis 68 of the first and second middle crosspieces 59, 61 of the associated frame 52, until the first upright 63c is located beyond the associated stop 67, which has the effect of preventing any pivoting of said structure 63 at least towards the rear of the feed barrier 51.

To release the pivoting and return the feed barrier 51 to the "access" position, the procedure is reversed by moving the upper end of the control lever 64 of the blocking means 55 towards the frames 52.

It is understood that with this last embodiment of the feed barrier 51, the space between the first and second vertical uprights 56, 60 is variable, said space being at its maximum when the feed barrier 51 is in the "access" position and thus allows a person to pass through. This advantageous configuration allows the farmer to enter through the feed barrier 51 to gain access to the animal's living area or vice versa.

To allow the feed barriers 1, 51 according to the invention to respect the animal's movements, each flap 4, 54 can pivot at least to the front, but also and from the rear of the associated frame 2, 52 about a generally horizontal axis.

It is understood, without departing from the scope of the present invention, that each frame 2, 52 can be oriented symmetrically to those described above, so as to define a J-shaped internal space 3, 53 with the ground and an adjacent frame 2, 52 or end post 10, 58.

The feed barrier 1 according to the invention is intended in particular for cattle, but it could also be used for rearing other animals such as for example sheep or goats.

Finally, it goes without saying that the examples of feed barriers 1 according to the invention described above are only particular illustrations of the invention and are in no way limiting.

The invention claimed is:
1. A feed barrier, comprising:
   a plurality of vertical, planar frames arranged side-by-side in a row along a trough of a barn, each frame defining an L-shaped internal space with a ground and an adjacent frame or end post, the L-shaped internal space being subdivided into an upper portion and a lower portion, a width of the lower portion being greater than a width of the upper portion;
   a plurality of flaps, each flap connected to an associated frame, disposed in the lower portion of the L-shaped internal space thereof, and movable by pivoting and sliding relative to the associated frame for closing off or not closing off at least a part of the lower portion of said space; and
   mechanical blocking means for changing the feed barrier between an access position in which each flap can at least pivot towards a front and a rear of the associated frame about a generally horizontal axis, and a blocked position, in which said pivoting is blocked at least to the rear of the associated frame, and vice versa;
   wherein each frame comprises:

a first vertical upright configured to be fixed to the ground at a lower end thereof, an upper crosspiece extending generally perpendicularly to said first upright from an upper end of said first upright, a second vertical upright extending towards the ground from said upper crosspiece, the second vertical upright having a height substantially equal to half a height of said first upright, and a middle crosspiece extending from a lower end of said second upright, and extending generally perpendicularly to said first upright in a direction away from said first upright;

and wherein each flap is disposed below said middle crosspiece of the associated frame.

2. The feed barrier according to claim 1, wherein:

the second vertical upright extends to the ground from a free end of said upper crosspiece;

the middle crosspiece extends generally parallel to said upper crosspiece from the lower end of said second upright; and an end of said middle crosspiece opposite the second upright is fixed to the first upright of an adjacent frame or to an upper end of an end post.

3. The feed barrier according to claim 1, wherein each flap comprises a planar structure arranged below a middle crosspiece of the associated frame and being configured so that a height and a width of the planar structure are strictly lower respectively than a distance between an underside of said middle crosspiece and the ground and the length of said middle crosspiece, and wherein each flap is associated with connecting means for connecting the structure to the middle crosspiece of the associated frame, so as to pivot said structure about a longitudinal axis of said middle crosspiece and slide said structure along said longitudinal axis.

4. The feed barrier according to claim 3, wherein the connecting means includes at least a first ring fixed to a top of the structure and arranged around the middle crosspiece of the associated frame, an internal diameter of said first ring being strictly greater than an external diameter of said middle crosspiece.

5. The feed barrier according to claim 4, wherein the connecting means includes a second ring identical to said first ring and arranged on a side of the second upright of the associated frame and wherein the first and second rings are each formed by two half-rings assembled together.

6. The feed barrier according to claim 1, wherein the blocking means includes at least:

a control lever pivoting about a horizontal axis perpendicular to the row of frames, a generally horizontal bar arranged along the frames, connected at one end to a lower end of said control lever and movable in translation along a longitudinal axis of the horizontal bar, a plurality of generally vertical arms fixed at their lower end along the bar, each arm being connected removably to the flap of one of the frames, and a stop arranged to be fixed to the ground on the rear side of each frame substantially at a foot of a second upright of each frame.

7. The feed barrier according to claim 4, wherein an upper end of an arm is provided with a hook capable of pivoting to cooperate with a top of the first ring, the hook being associated with a torsion spring for maintaining the cooperation between said hook and the top of said first ring.

8. The feed barrier according to claim 1, further comprising a plate configured to be fixed to the ground of the barn along the trough, to which plate the frames, the end post and the blocking means are fixed.

9. The feed barrier according to claim 1, wherein:

an end of the upper crosspiece opposite said first upright is fixed to the first upright of an adjacent frame or to an upper end of an end post;

the middle crosspiece extends generally parallel to said upper crosspiece from the lower end of said second upright;

the second vertical upright is mounted to slide on said upper crosspiece; and each frame further comprises a second middle crosspiece extending generally parallel to said upper crosspiece from the lower end of said second upright said second middle crosspiece being mounted to slide on the first middle crosspiece, the middle crosspiece being shaped to be inserted coaxially into said second middle crosspiece.

10. The feed barrier according to claim 9, wherein the flap comprises a planar structure arranged below the second middle crosspiece of the associated frame and being configured so that a height and a width of the planar structure are both strictly lower than a distance between an underside of said second middle crosspiece and the ground and a length of said second middle crosspiece, and wherein the flap is pivotably mounted on the lower edge of said second middle crosspiece.

11. The feed barrier according to claim 9, wherein the blocking means includes at least:

a control lever pivoting about a vertical axis parallel to the row of frames, a generally horizontal bar arranged along the frames at a level of the upper crosspiece, wherein one end of the generally horizontal bar is connected to one end of said control lever and movable in translation along a longitudinal axis of the generally horizontal bar, a plurality of arms fixed at one of their ends along the bar, each arm being connected removably at its other end to the second upright of one of the frames, and a stop arranged to be fixed relative to the ground, or where necessary to the lower bar, from the rear side of each frame.

12. The feed barrier according to claim 9, further comprising a plate configured to be fixed to the ground of the barn along the trough, to which plate the frames and the end post are fixed.

* * * * *